(12) United States Patent
Schwarz et al.

(10) Patent No.: US 7,908,840 B2
(45) Date of Patent: Mar. 22, 2011

(54) TURBINE ENGINE WITH INTEGRATED GENERATOR HAVING SHARED LUBRICATION SYSTEM

(75) Inventors: Frederick M. Schwarz, Glastonbury, CT (US); Jorn A. Glahn, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 891 days.

(21) Appl. No.: 11/605,671

(22) Filed: Nov. 29, 2006

(65) Prior Publication Data

US 2008/0121376 A1 May 29, 2008

(51) Int. Cl.
*F02C 7/06* (2006.01)

(52) U.S. Cl. ...................................... 60/39.08; 184/6.11

(58) Field of Classification Search ................ 60/39.08, 60/39.83, 736, 266; 184/6.11; 165/41, 51, 165/203
See application file for complete search history.

(56) References Cited

U.S. PATENT DOCUMENTS

| | | | | |
|---|---|---|---|---|
| 3,527,054 | A | * | 9/1970 | Hemsworth ................ 60/39.08 |
| 3,658,153 | A | | 4/1972 | Berman |
| 4,020,632 | A | * | 5/1977 | Coffinberry et al. ............ 60/773 |
| 4,354,345 | A | * | 10/1982 | Dreisbach et al. ........... 60/39.08 |
| 4,741,152 | A | * | 5/1988 | Burr et al. ....................... 60/772 |
| 4,899,850 | A | * | 2/1990 | Koller et al. .................. 184/6.3 |
| 5,615,547 | A | * | 4/1997 | Beutin et al. ............... 60/39.08 |
| 6,886,324 | B1 | * | 5/2005 | Handshuh et al. .......... 60/39.08 |
| 2001/0047647 | A1 | | 12/2001 | Cornet |
| 2003/0136103 | A1 | * | 7/2003 | Reuter et al. ................ 60/39.08 |
| 2005/0217272 | A1 | * | 10/2005 | Sheridan et al. ............... 60/772 |
| 2008/0121376 | A1 | * | 5/2008 | Schwarz et al. ......... 165/104.28 |

FOREIGN PATENT DOCUMENTS

EP 0 391 609 A1 10/2001

OTHER PUBLICATIONS

Official Search Report of the European Patent Office in counterpart foreign Application No. 07254626 filed Nov. 29, 2007.

* cited by examiner

*Primary Examiner* — Michael Cuff
*Assistant Examiner* — Phutthiwat Wongwian
(74) *Attorney, Agent, or Firm* — Kinney & Lange, P.A.

(57) ABSTRACT

A heat exchange system for use in operating equipment having a plurality of subsystems in each of which a common working fluid is utilized to provide selected operations in that subsystem with a reservoir containing at least some of the common working fluid and has both a supply system and a return system connected between the reservoir and each of the plurality of subsystems through which any common working fluid in the reservoir can be conveyed. An airstream heat exchanger is provided connected in one of the supply and return systems so as to have the common working fluid conveyed therethrough cooled at selectively variable rates in the airstreams passing thereby during at least some such uses of the operating equipment.

15 Claims, 6 Drawing Sheets

TURBINE ENGINE WITH INTEGRATED GENERATOR HAVING SHARED LUBRICATION SYSTEM

BACKGROUND OF THE INVENTION

The present invention relates to lubrication systems for turbine engines and for associated integrated drive electrical power generator systems and, more particularly, to various outside fluid and lubricant heat exchangers for use in maintaining desired temperatures of the lubricants in such engines and systems.

Lubrication systems for turbine engines and associated equipment, such as a turbofan engine and an associated integrated drive electrical power generator, provide pressurized lubricant, an oil, to lubricate, cool and clean the engine main bearings, gearbox gears, and the like. Similarly, pressurized oil is used for the lubrication of bearings and other parts in an associated integrated drive generator system. During such lubrications, heating of the lubricant is caused to occur due to mechanical energy losses in the lubricated apparatus. Thermal management of such lubricants is very important for continued successful operation of such lubrication systems in the apparatus lubricated thereby.

The amount of heat necessary to be ejected from lubricants in such systems is increasing in evolving engines and associated systems because of the use of larger electrical generators, for instance, in aircraft turbine engines due to increasing consumption of electrical power in the aircraft powered thereby, and because of the advances in aircraft turbine engines such as the use of geared turbofans for such aircraft with large fan-drive gearboxes. Despite the added heat generated by the such modified and expanded equipment, the necessary lubricating oil operating temperature ranges to provide satisfactory lubricating performance have not changed for the most part and, in some instances, the upper operating temperature limits have been reduced.

The lubrication system for a turbofan engine in an aircraft typically has a first heat exchanger providing lubricating oil passing through passageways in that heat exchanger that is cooled by the fuel stream flowing past these passageways. This arrangement permits the lubricating oil to reject heat therein to the fuel being burned by the engine thereby heating that fuel to help recover some of the energy lost in the combustor of the engine.

Because, in some flight situations, more heat is generated in the lubricating oil than is needed for warming the fuel, a portion of the lubricating oil can be forced to bypass the heat exchanger for the fuel and the lubricating oil, and the oil can be directed to a further heat exchanger where the heat therein is transferred to the air in the secondary airstream provided by the fan of the turbofan engine. In a typical arrangement, a duct is provided in the fan cowling through which a portion of the airstream is diverted, or, more recently, provided in a fan duct bifurcation structure, and the air and lubricating oil heat exchanger is placed in this duct so that the lubricating oil passing through passageways in that heat exchanger is cooled by the duct airstream flowing past these passageways in the exchanger. If such additional cooling of the oil is not needed in a flight situation, the air can again be forced to bypass this air and lubricating oil heat exchanger.

An integrated drive generator system that is powered by the associated turbofan engine also has a lubrication system in which the oil used as a lubricant therein is forced by a pump through a heat exchanger where the heat therein is transferred to the air in the secondary airstream provided by the fan of the turbofan engine. Here, too, a duct is typically provided in the generator structure through which a portion of the airstream is diverted with the generator air and lubricating oil heat exchanger placed therein so that the lubricating oil passing through passageways in that heat exchanger is cooled by the duct airstream flowing past these passageways in the exchanger.

Any of the fan airstream that is diverted to pass through the lubricating oil and air heat exchangers in such duct systems may be regulated by some air valve or stream limiting door in the duct containing the exchanger, and the exchanger must be large enough, insofar as assuring that a sufficient part of the cooling engine fan airstream flows over a sufficient amount of lubricating oil flowing in passageways therein, to provide adequate oil cooling for the most extreme preflight or flight conditions encountered, or both. This is true even though this heat exchanger size is not needed for many, or even most, of these preflight or flight conditions. Such a larger sized exchanger correspondingly requires larger fairings about that exchanger leading to a) possible detachment of the fan streams therefrom and the resulting vortex losses absent further preventive measures, b) a larger inlet to the duct possibly resulting in the "spilling" out of incoming air and the accompanying eddy and mixing losses, and to c) a larger range of required motion for the required larger size duct outlet flaps possibly leading to this flap interfering more with the fan airstream passing the outside of the flap when in the range of being nearly fully open to being fully closed. These three consequences, even in an optimally configured arrangement, will result in pressure losses. Thus, such an air and lubricating oil heat exchanger duct based system continually leads to thrust losses in the turbofan engine despite being unnecessary for cooling the lubricating oil in many flight situations.

One arrangement allowing for reduced sizes of lubricating oil and air heat exchangers, and so the ducts in which they are provided, is to add a heat exchanger coupling the lubrication systems in the engine and the generator. An oil and oil heat exchanger can be relatively small because of being a liquid to liquid heat exchanger with a resulting very efficient transfer of heat. This coupling allows the oil and air heat exchangers in each lubrication system to help cool the other since the extreme conditions for needing cooling in one system differ from the extreme conditions for needing cooling in the other. Nevertheless, space for a further heat exchanger must be found to accommodate such an oil and oil heat exchanger. Hence, there is a strong desire for a lubricating oil thermal management system to control fuel and oil temperatures that also reduces such thrust losses and additionally reduces the volume required therefor in the more compact available spaces in advanced turbofan engines and associated equipment arrangements.

BRIEF SUMMARY OF THE INVENTION

The present invention provides a heat exchange system for use in operating equipment having a plurality of subsystems in each of which a common working fluid is utilized to provide selected operations in that subsystem with the heat exchange system providing air and working fluid heat exchanges to cool that common working fluid at selectively variable rates in airstreams occurring with at least some uses of the operating equipment. The system has a reservoir containing at least some of the common working fluid and has both a supply system connected between the reservoir and each of the plurality of subsystems through which any common working fluid in the reservoir can be conveyed from the reservoir to each of those subsystems and a return system connected between each of the plurality of subsystems and the reservoir through which the common working fluid passing through each of the plurality of subsystems can be conveyed to the reservoir. An airstream heat exchanger is provided connected in one of the supply and return systems so as to have the common working fluid conveyed therethrough cooled at selectively variable rates in the airstreams passing thereby during at least some such uses of the operating equipment.

DETAILED DESCRIPTION

Figure 1:
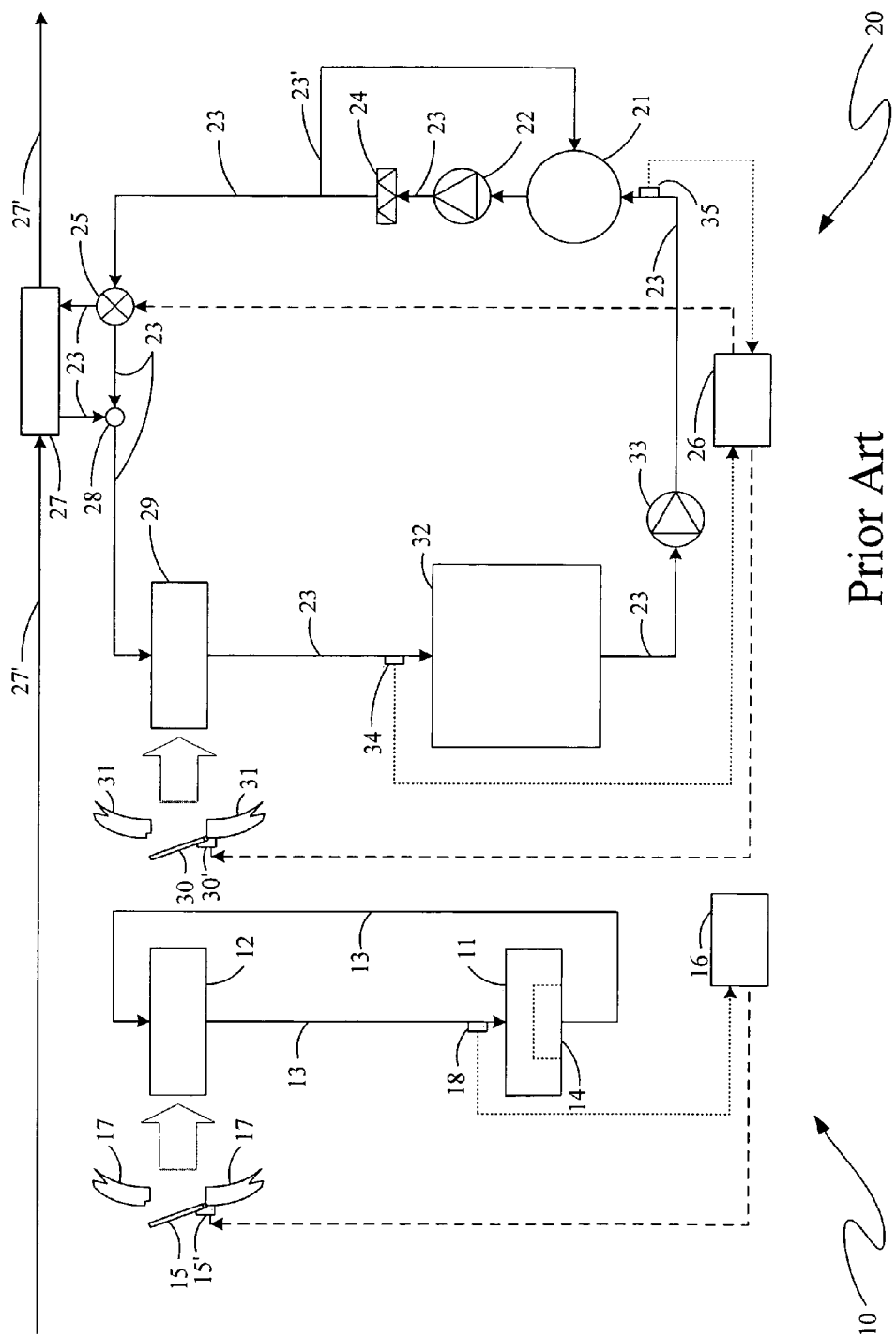
FIG. 1 shows a schematic diagram of an integrated drive electrical generator lubrication system and a turbofan engine lubrication system.

Lubrication systems typically in use currently with turbofan engines and associated integrated drive generator systems are represented in the schematic diagram shown in FIG. 1 where there is a lubrication system for the turbofan engine that is shown entirely separate from the lubrication system for the generator. Thus, on the left is shown a lubrication system, 10, for an integrated drive generator system having therein an electrical generator, 11, with a rotor that is forcibly rotated by the associated turbofan engine, and an air and oil heat exchanger, 12, interconnected to generator 11 with oil conduits, 13, allowing therethrough the circulation of the system lubricant, or the oil, through the moving parts of the generator such as bearings and through the plurality of oil carrying passageways of the exchanger about and between which secondary airstreams from the engine fan can flow, the oil being selectively forced to so circulate by a pump, 14, internal to generator 11.

Air and oil heat exchanger 12 has a moveable flap, 15, controlled by a computer controller, 16, through appropriately operating a motor and associated position sensor device, 15', to limit the fan airstream flow past this exchanger at its location as positioned in a duct, 17. A temperature sensor, 18, senses the temperature of the oil as it enters generator 11 and returns this information to computer 16.

On the right side of FIG. 1 is shown a lubrication system, 20, for a turbofan engine having a lubricant or oil reservoir, 21, for storing quantities of oil not then being circulated through the remainder of the lubrication system out of which a pump, 22, forces oil first through one of a plurality of oil conduits, 23, through a filter, 24, and then through others of conduits 23 first to a bypass valve, 25, and then to the lubricated parts in the remainder of the lubrication system. An exception is any fraction of the oil forced through the suitably dimensioned orifice in a trim conduit, 23', which conveys back to reservoir 21 any oil not accepted through bypass valve 25 that results from overpressure in the oil as generated by pump 22.

The oil exiting filter 24 not entering trim conduit 23' goes under pressure to computer controlled bypass valve 25 by which a computer controller, 26, can direct a selected fraction of this oil flow to be forced through a fuel and oil heat exchanger, 27, to further heat the fuel flowing in a fuel line, 27', in which exchanger 27 is included and to further cool that fraction of the oil provided thereto. The oil flow fraction in exchanger 27, if any, is recombined in a combiner arrangement, 28, with any of the oil exiting filter 24 that computer controller 26 caused to bypass exchanger 27. Exchanger 27 is typically of a relatively small size because of the more efficient heat transfers between liquids due to their greater mass density as compared to the transfer between a liquid and a gas in an air and oil heat exchanger, for example, as a result of the substantially smaller mass density of that gas or gases.

The combined oil from combiner 28 is forced under pressure through oil carrying tubes (not explicitly shown in FIG. 1) of an air cooled heat exchanger, 29. The degree of air cooling of the oil flowing through exchanger 29 due to secondary airsteams from the engine fan flowing past and between those tubes is controlled by the position of a moveable flap, 30, as selected by computer controller 26 through appropriately operating a motor and an associated position sensor device, 30', to control air flow through a duct, 31, in which exchanger 29 is positioned.

The oil emerging from exchanger 29 is then forced through relatively low temperature sensitivity parts, 32, to be lubricated typically including roller bearings, seals and gears. The oil that gathers in the corresponding sump following this lubrication thereby is then returned by a scavenge pump, 33, to reservoir 21. A temperature sensor, 34, senses the temperature of the oil as it proceeds to parts 32, and another temperature sensor, 35, senses the temperature of the oil as it enters reservoir 21, and they both returns their respective information to computer controller 26.

Figure 2:
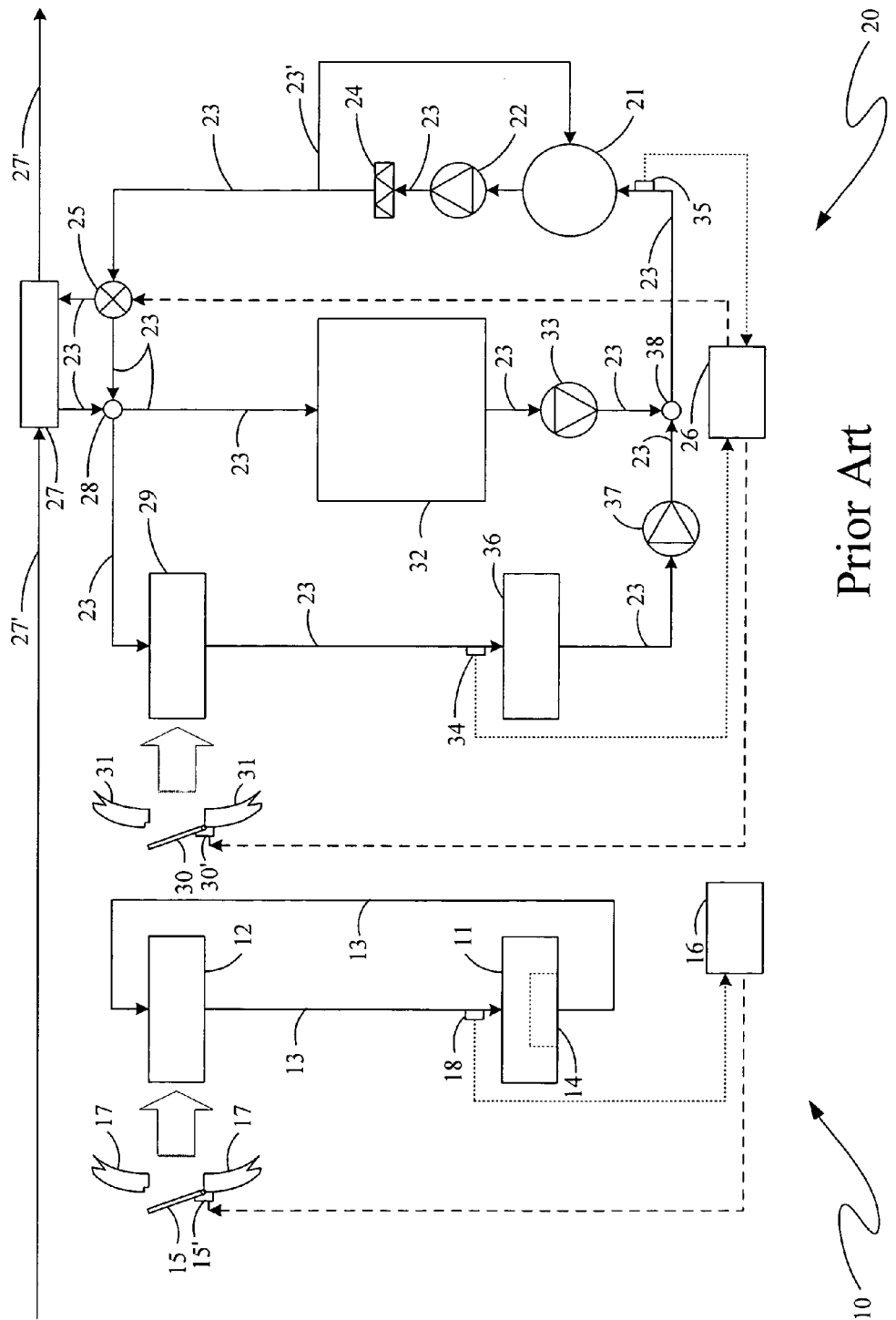
FIG. 2 shows a schematic diagram of an integrated drive electrical generator lubrication system and an alternative turbofan engine lubrication system.

A variation in the typical lubrications systems arrangement shown in FIG. 1 is shown in the schematic diagram of FIG. 2 in which some of higher temperature sensitivity parts, 36, to be lubricated must have the oil providing such lubrication being at a significantly lower temperature than the oil lubricating the other parts 32 having a tolerance for higher temperatures. Such temperature sensitive parts 36 could be, for example, journal bearings for the gears operating the fan in a geared turbofan engine. In this situation, air and oil heat exchanger 29 is positioned in conduits 23 ahead of low maintained temperature parts 36, as is temperature sensor 34, to assure that the oil temperature can be controlled by computer controller 26 to the smaller necessary value and that such control of temperature there will be sufficient to leave the oil lubricating the other parts to be lubricated 32 cool enough for those purposes. A further scavenge pump, 37, is added to return the oil that gathers in the corresponding sump following this lubrication thereby. The return oil pumped by both of scavenge pumps 33 and 37 is combined in a further combiner arrangement, 38, and returned to reservoir 21.

As indicated above, air and oil heat exchangers 12 and 29 must each be capable of providing adequate oil cooling for the most extreme preflight or flight conditions encountered by their respective lubrication systems. That is, they must be large enough to assure that a sufficient part of the cooling engine fan airstream flows over a sufficient amount of lubricating oil flowing through passageways therein per unit time. Typically, however, the extremes of the preflight or flight conditions encountered by air and oil heat exchanger 12 in generator lubrication system 10 is not the same as the extremes of the preflight or flight conditions encountered by air and oil heat exchanger 29 in turbofan engine lubrication system 20.

Typically, for the turbofan engine, the likely most extreme heating increase of the lubricant to be encountered by its lubrication system in relation to the cooling capability of the air flow thereabout occurs in the conditions of the aircraft fuel being, or having become, relatively hot while the aircraft was on the ground followed immediately thereafter by operation at very high altitude so that the heat in the lubricant can not be significantly further transferred to the fuel in the aircraft fuel and oil heat exchanger. In this circumstance, the aircraft takes off with the engine developing high thrust to subsequently reach the top of its climb after the takeoff, and during which climb the engine is generating considerable heat in its lubricant.

At this top of the climb, if the engine thrust is considerably reduced to end such climbing and, thereby, significantly reduce the engine fan secondary airstream used by the engine lubrication system air and oil heat exchanger to cool the lubricant, an extreme in the heating of the engine oil occurs. This is compounded by the cooling there depending on the much lower heat transfer efficiency provided by air cooling due to the relatively small mass density of air. The engine lubrication system at this extreme condition will need to be sufficiently capable to limit the temperature of its lubricant to not exceed some value, typically 225° F. This system capability is needed to deal with this very infrequent operating conditions occurrence and thus leaves the engine lubrication system with extra cooling capacity during times the aircraft is on the ground with the engine merely idling during all preflight conditions and during all other flight conditions.

The generator lubrication system, on the other hand, is likely to encounter its most extreme heating increase of its lubricant in relation to the available air cooling capability on the ground on a hot day. The generator in this circumstance will typically supply its greatest load, and generate the most heat in its lubricant in doing so, as the aircraft interior is cooled for example by electrically operated air conditioning and has its lights and instruments also operating to thereby provide some maximum electrical load. In this situation, the engine will be just idling so that there will not be much of an engine fan secondary airstream to be used by the generator lubrication system air and oil heat exchanger to cool the lubricant. Here, too, the lubrication system at this extreme condition will need to limit the temperature of its lubricant to not exceed some value, typically 200° F. However, the aircraft taking off greatly increases the engine fan secondary airstream so that, even though the generator heat output will increase somewhat compared to being on the ground with the engine idling, the cooling capacity of the generator air cooled oil and air heat exchanger is increased much more thereby also leaving extra cooling capacity in this lubrication system in this situation.

In most preflight and flight situations both generator lubrication system 10 and engine lubrication system 20 of FIGS. 1 and 2 would be able to have the temperatures of the lubricants used therein kept below their respective limits with relatively small cooling capacities in air and lubricant heat exchangers 12 and 29, respectively, thus allowing use of correspondingly relatively small structural volumes therefor were those the only conditions encountered. But, as indicated above, each of these lubrication systems must instead be sized to be capable of keeping the temperatures of the lubricants therein within those limits in these extreme conditions described therefor above to avoid damage to the generator and engine no matter how seldom such conditions are encountered. Such larger heat exchangers thus necessarily require larger ducts 17 and 31, respectively, which, if kept open to the engine fan secondary airstream, will add significant drag and the corresponding loss in efficiency. Thus, flaps 15 and 30 are used to enable the closing off of those ducts when little cooling is needed from air and lubricant heat exchangers 12 and 29. Nonetheless, drag losses remain through the ducts compounded by the additional losses caused by the larger ducts protruding into the fan airstream, and there is substantial difficulty in finding sufficient volume in the engine nacelle to accommodate such larger exchangers and ducts.

However, the occurrence of the extremes of lubricant heating in the two lubrication systems at different times in preflight and flight situations, and the resultant availability of extra cooling capacity in the opposite system at times of extreme heating of one of these two lubrication systems, allows use of a common, is shared single lubrication system for both generator lubrication system 10 and engine lubrication system 20. The heating provided by the electrical generator and the engine at the extreme conditions for each results in that heat being generated in the common lubricant to thereby be transferred the oil and air heat exchanger near the major heat generator of the two as well as to the oil and air heat exchanger near the other.

The one of the engine and electrical generator that is not the major heat generator at that time will not be in or near its extreme lubricant heating condition, and so the oil and air heat exchanger near it will have available therein extra cooling capacity. Hence, if the electrical generator and the engine share a common lubrication system, either of air and lubricant heat exchangers 12 and 29, or both, provided therein may be "undersized" (or possibly, just one of them would be needed in the shared system if it were sized to handle the extremes of the cooling needs for either of the engine and the integrated drive electrical generator). That is, each of these exchangers may be sized smaller than necessary for the air and lubricant heat exchangers that would otherwise needed in generator lubrication system 10 and engine lubrication system 20 of FIGS. 1 and 2 if they are required individually to be capable of always maintaining the lubricant in its corresponding system below its temperature limit.

The electrical generator and the engine sharing a common lubrication system can introduce possible problems not encountered when those systems are separated from one another. Metal debris from the engine may be deposited into the oil lubricating the generator, especially ferrous metal subject to the magnetic fields occurring in the generator during its operation, which can cause problems in that generator. These can be trapped to prevent their entering the generator through use of a filter and ferrous material chip magnet device.

Separated electrical generators have been sealed units and so their lubrications systems have not been susceptible to environmental moisture condensing therein during heating and cooling temperature variations, but engine lubrication systems are vented to the atmosphere. Various chemicals are present in electrical insulation for the generator windings and the windings themselves which could cause adverse chemical reactions in the engine. These latter problems can be minimized by sufficiently frequent oil changes but may be better circumvented by using materials in these systems that are compatible with one another so as to avoid corrosion therein.

Figure 3:
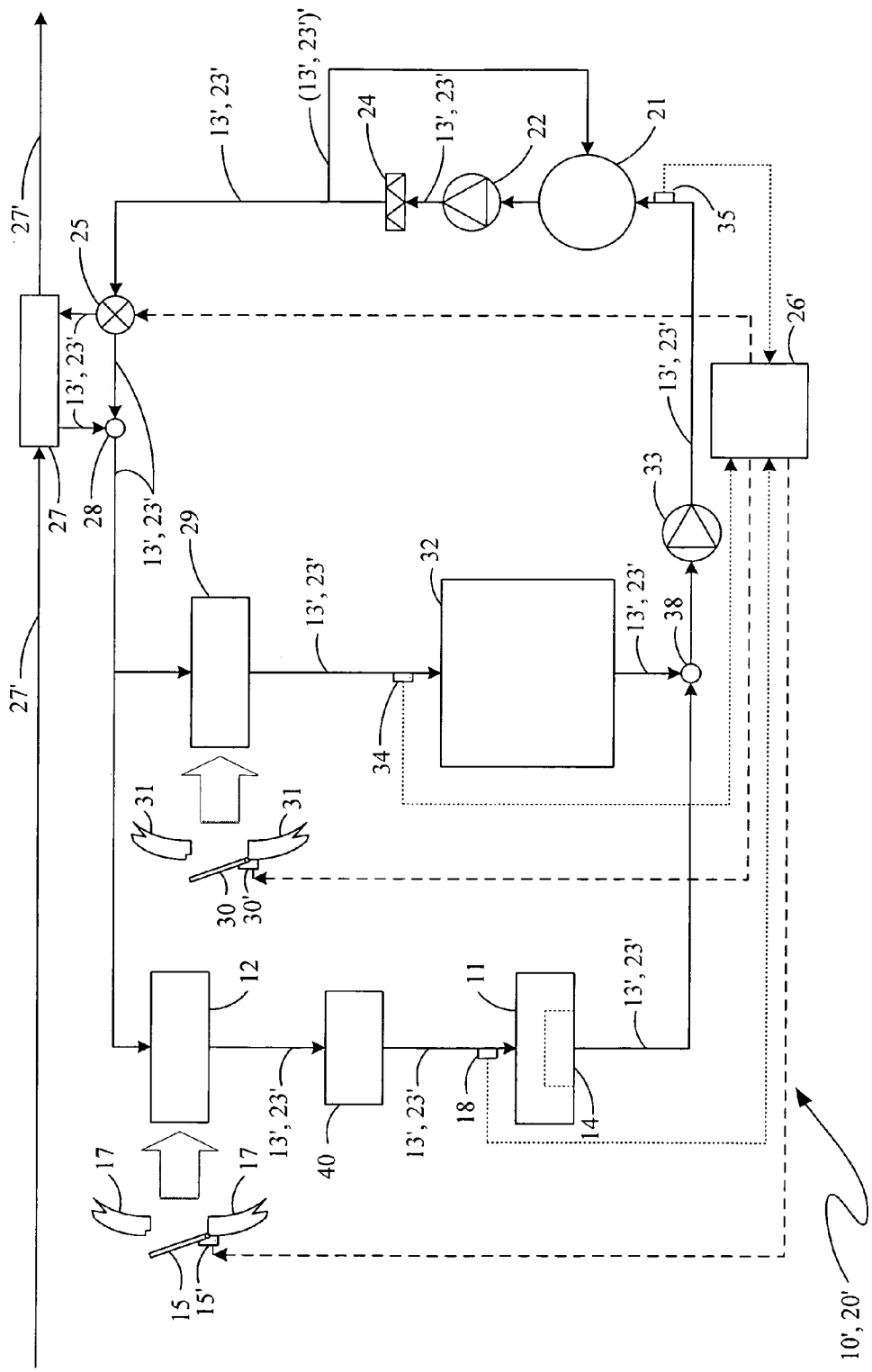
FIG. 3 shows a schematic diagram of an integrated lubrication system embodying the present invention.

FIG. 3 shows in a schematic diagram a common generator and engine lubrication system, 10', 20', based on generator lubrication system 10 and engine lubrication system 20 of FIG. 1, this common lubrication system being under operational control of a common computer controller, 26'. The same numerical designations are used in FIG. 3 as were used in FIG. 2 for the same system components present in each. Air and oil heat exchanger 12 is interconnected to generator 11 here through a filter and ferrous material chip magnet device, 40, in one branch of the lubrication system network connected in succession by oil conduits, 13', 23'. This series arrangement of these connected devices allows through them the circulation of the system lubricant, or the oil, and through the moving parts of generator 11 with any metal debris from the engine being trapped in device 40 before reaching generator 11. This oil is supplied to the network branch with exchanger 12 in the same manner in combined lubrication system 10', 20' as oil is supplied to flow through a further network branch in parallel therewith in which separate air cooled heat exchanger 29 is connected by suitable ones of oil conduits, 13', 23' to relatively low temperature sensitivity moving parts 32 to supply oil thereto.

That is, this oil is supplied to network branches in parallel containing air cooled heat exchangers 12 and 29 from combiner arrangement 28 to which they are connected, the supplied oil including the oil flow fraction in fuel and oil heat exchanger 27, if any, that is recombined in combiner arrangement 28 with any of the oil exiting filter 24 that computer controller 26' caused to bypass exchanger 27 through computer controlled bypass valve 25. The oil that gathers in the corresponding sumps for generator 11 and engine parts 32 following the lubrication thereby is then returned by a single scavenge pump 33 connected at the opposite ends of these network branches by suitable ones of oil conduits, 13', 23' on through another such conduit to reservoir 21.

The degree of air cooling of the oil flowing through exchangers 12 and 29 due to secondary airsteams from the engine fan flowing through them is again controlled by the position of moveable flaps 15 and 30, respectively, as selected by computer controller 26' in conjunction with temperature sensors 18 and 34 through appropriately operating corresponding ones of motors and an associated position sensor devices 15' and 30'. This oil cooling control arrangement works well since, typically, the engine fan secondary airstream needs of each of exchangers 12 and 29 are different in differing preflight and flight conditions. Separate control of the airstreams passing through each exchanger will minimize the quantities of air needed from the engine fan secondary airstream by each of those exchangers to thereby cause the minimum of engine thrust losses. The sizes of heat exchangers 12 and 29 are chosen to each provide enough surface heat transfer area in total about the oil streams flowing through the passageway structures therein so that the cooling airstreams flowing over those areas around and past those structures together are sufficient to assure that they can provide adequate cooling of the common lubrication system oil. That is, there must be enough heat transfer area on those passageway structure surfaces for the passing airstreams to absorb enough heat from the oil to keep the temperatures of that oil within the necessary limits therefor in the extreme conditions described above for both the generator and engine to avoid damage to either.

Figure 4:
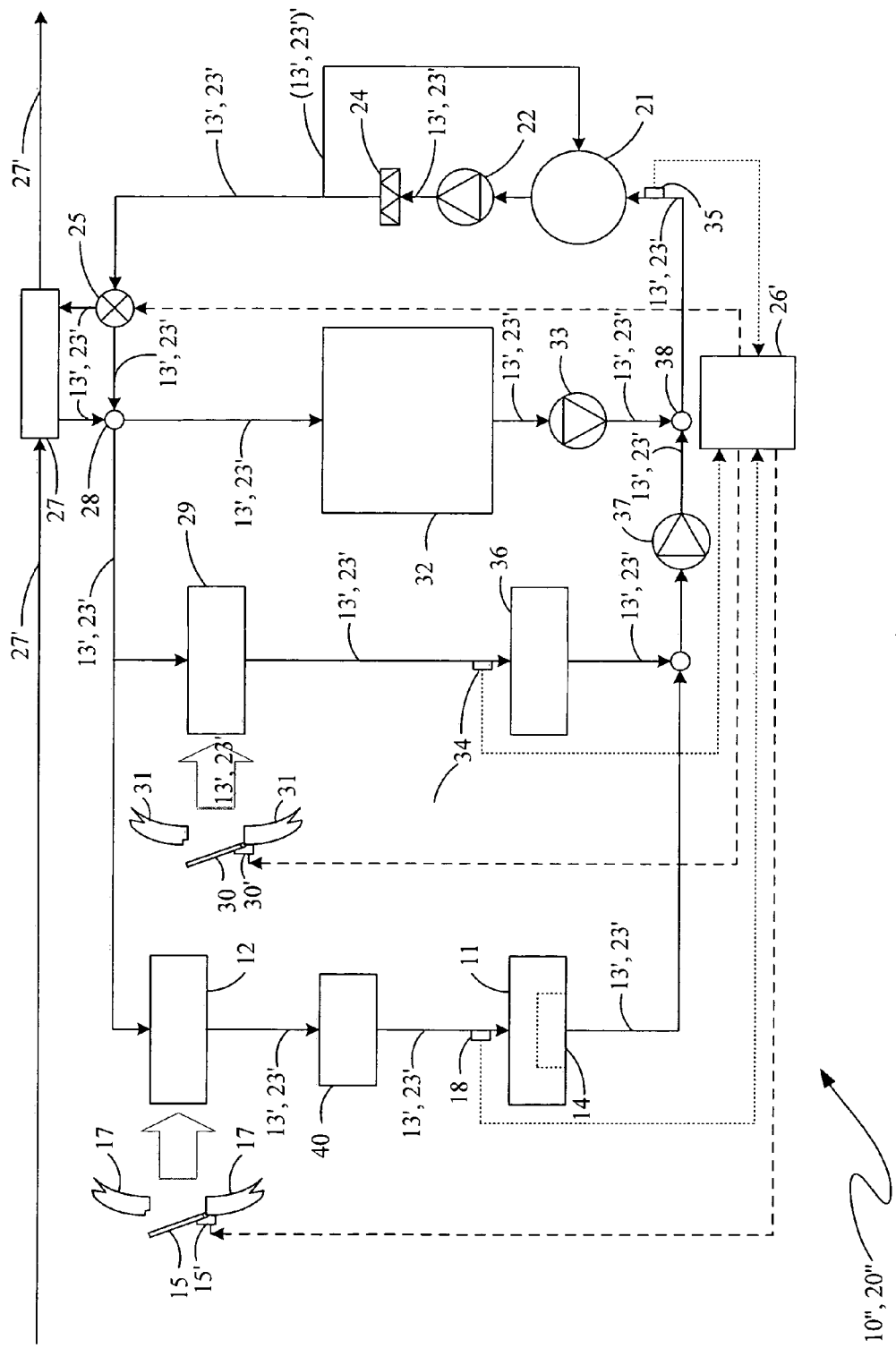
FIG. 4 shows a schematic diagram of an alternative integrated lubrication system embodying the present invention.

FIG. 4 shows in a schematic diagram a common generator and engine lubrication system, 10", 20", based on generator lubrication system 10 and engine lubrication system 20 of FIG. 2 with heat sensitive engine components 36 such as journal bearings, this common lubrication system again being under operational control of common computer controller 26'. The same numerical designations are used in FIG. 4 as were used in FIG. 2 for the same system components present in each.

This common lubrication system has components 36 of the engine with greater heat sensitivity in a separate oil flow branch in the common system with air cooled exchanger 29 connected also in that branch ahead of components 36. Thus, oil is supplied to the branch with air cooled exchanger 12 ahead of generator 11 from combiner 28 in the same manner in combined lubrication system 10", 20" as oil is supplied to flow through the parallel branch with separate air cooled heat exchanger 29 to lubricate the relatively high temperature sensitivity moving parts 36 and as supplied to lubricate the relatively low temperature sensitivity moving parts 32 in a third parallel network branch. Here, too, exchangers 12 and 29 must be sized large enough between them to keep the temperatures of the common lubrication oil within the necessary limits therefor in the extreme conditions described above for both the generator and engine.

Hence, oil is supplied through oil conduits 13', 23' to air cooled heat exchangers 12 and 29, and directly to relatively low temperature sensitivity moving parts 32, from combiner arrangement 28 including the oil flow fraction in fuel and oil heat exchanger 27, if any, that is recombined in combiner arrangement 28 with any of the oil exiting filter 24 that computer controller 26' caused to bypass exchanger 27 through computer controlled bypass valve 25. The oil that gathers in the corresponding sumps for generator 11 and engine parts 32 following the lubrication thereby is then returned by scavenge pump 37 to reservoir 21, and the oil that gathers in the corresponding sump for engine parts 32 following the lubrication thereby is then returned by scavenge pump 33 to reservoir 21. The degree of air cooling of the oil flowing through exchangers 12 and 29 due to secondary airsteams from the engine fan flowing through them is again controlled by the position of moveable flaps 15 and 30, respectively, as selected by computer controller 26' with the same control advantages provided in common lubrication system 10", 20" of FIG. 4 as those provided in common lubrication system 10', 20' of FIG. 3.

Figure 5:
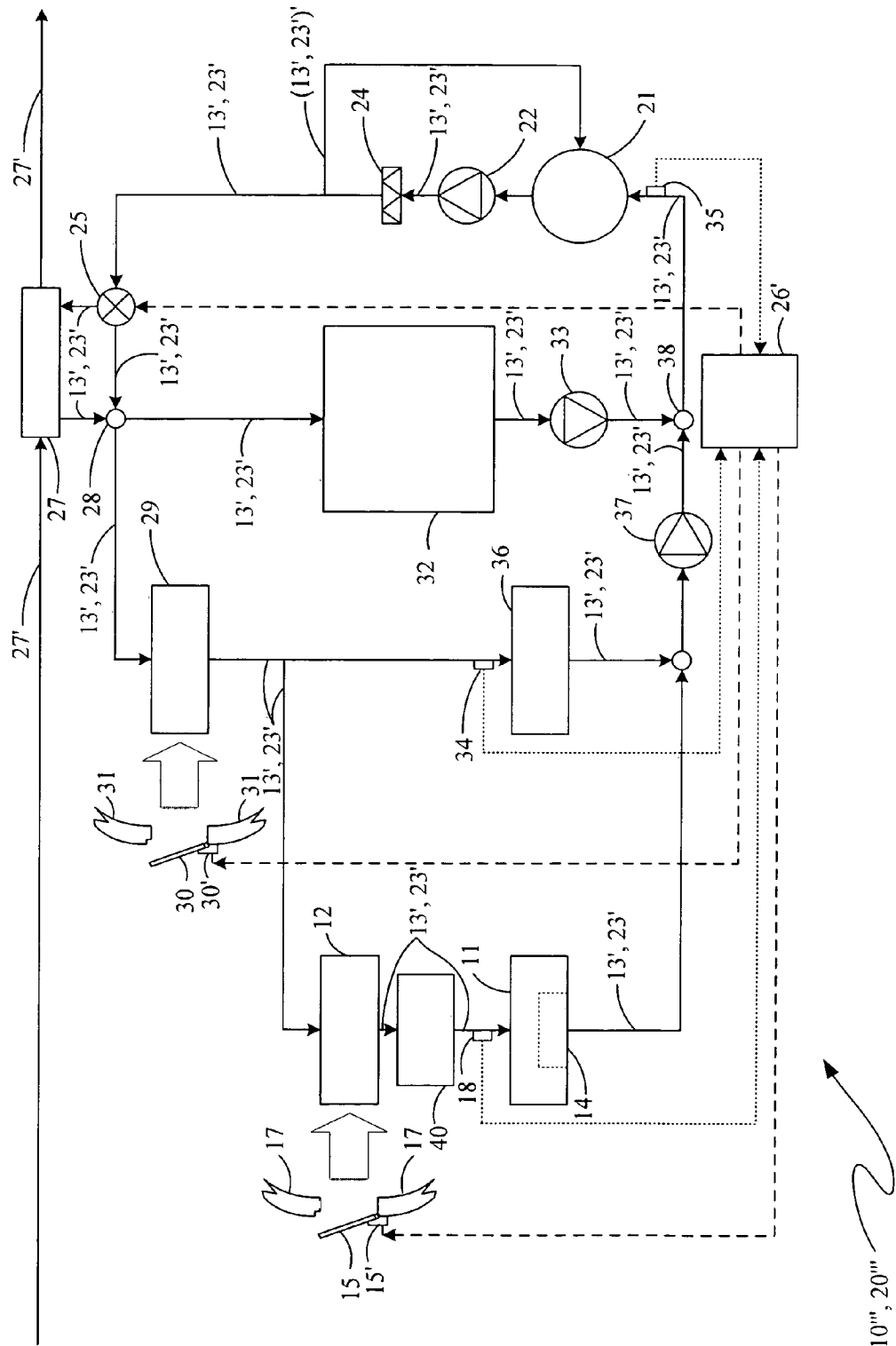
FIG. 5 shows a schematic diagram of an alternative integrated lubrication system embodying the present invention.

FIG. 5 shows in a schematic diagram a common generator and engine lubrication system, 10''', 20''', also based on generator lubrication system 10 and engine lubrication system 20 of FIG. 2 with heat sensitive engine components 36 such as journal bearings, this common lubrication system here again being under operational control of common computer controller 26'. A similar common generator and engine lubrication system can be based on generator lubrication system 10 and engine lubrication system 20 of FIG. 1. The same numerical designations are used in FIG. 5 as were used in FIG. 2 for the same system components present in each.

This alternative common lubrication system has components 36 of the engine with greater heat sensitivity in a separate oil flow branch in the common system connected in parallel with another oil flow network branch having air cooled heat exchanger 12 connected in that branch ahead of device 40 and generator 11. These two oil flow network branches, so connected in parallel with one another, are connected in series with air cooled heat exchanger 29 so that cooled oil from that exchanger is supplied to each. Thus, this oil cooled by exchanger 29 is supplied to that exchanger from combiner 28 in much the same manner as in combined lubrication system 10", 20", except that all of the oil for lubricating generator 11 and the relatively high temperature sensitivity moving parts 36 passes through that exchanger. Combiner 28 again supplies oil directly to lubricate the relatively low temperature sensitivity moving parts 32 in a flow branch that is now connected in parallel to the combination of the parallel connected flow branches containing generator 11 and relatively heat sensitive parts 32 connected in series with air cooled heat exchanger 29.

That is, oil is supplied through oil conduits 13', 23' to air cooled heat exchanger 29, and directly to relatively low temperature sensitivity moving parts 32, from combiner arrangement 28 including the oil flow fraction in fuel and oil heat exchanger 27, if any, that is recombined in combiner arrangement 28 with any of the oil exiting filter 24 that computer controller 26' caused to bypass exchanger 27 through computer controlled bypass valve 25. The oil that gathers in the corresponding sumps for generator 11 and engine parts 32 following the lubrication thereby is then returned by scavenge pump 37 to reservoir 21, and the oil that gathers in the corresponding sump for engine parts 32 following the lubrication thereby is then returned by scavenge pump 33 to reservoir 21. The degree of air cooling of the oil flowing through exchangers 12 and 29 due to secondary airstreams from the engine fan flowing through them is again controlled by the position of moveable flaps 15 and 30, respectively, as selected by computer controller 26' with the same control advantages provided in common lubrication system 10''', 20''' of FIG. 5 as those provided in common lubrication systems 10', 20' of FIG. 3 and 10'', 20'' of FIG. 4.

In this configuration, air and oil heat exchanger 12 provides supplemental cooling of the oil cooled and supplied by air and oil heat exchanger 29 for lubricating generator 11 after passing through filter and ferrous material chip magnet device 40. This arrangement can allow for some shifting of the sizing of air cooled heat exchangers 12 and 29 relative to one another to accommodate volume limitations in the engine nacelle that are more difficult to meet for one of these exchangers than for the other in their respective positions in that nacelle. Again, of course, exchangers 12 and 29 must be sized large enough between them to keep the temperatures of the common lubrication oil within the necessary limits therefor in the extreme conditions described above for both the generator and engine.

A consolidation of the volumes in an engine nacelle devoted to air and oil heat exchangers to just a single such volume through use of just one such exchanger is shown in a schematic diagram of a common generator and engine lubrication system, 10'''', 20'''', in FIG. 6, again shown based on generator lubrication system 10 and engine lubrication system 20 of FIG. 2 with heat sensitive engine components 36 such as journal bearings. This common lubrication system is once again under operational control of common computer controller 26'. Here, too, a similar common generator and engine lubrication system can be based on the generator lubrication system 10 and engine lubrication system 20 of FIG. 1. The same numerical designations are used in FIG. 6 as were used in FIGS. 2, 4 and 5 for the same system components present in each.

Figure 6:
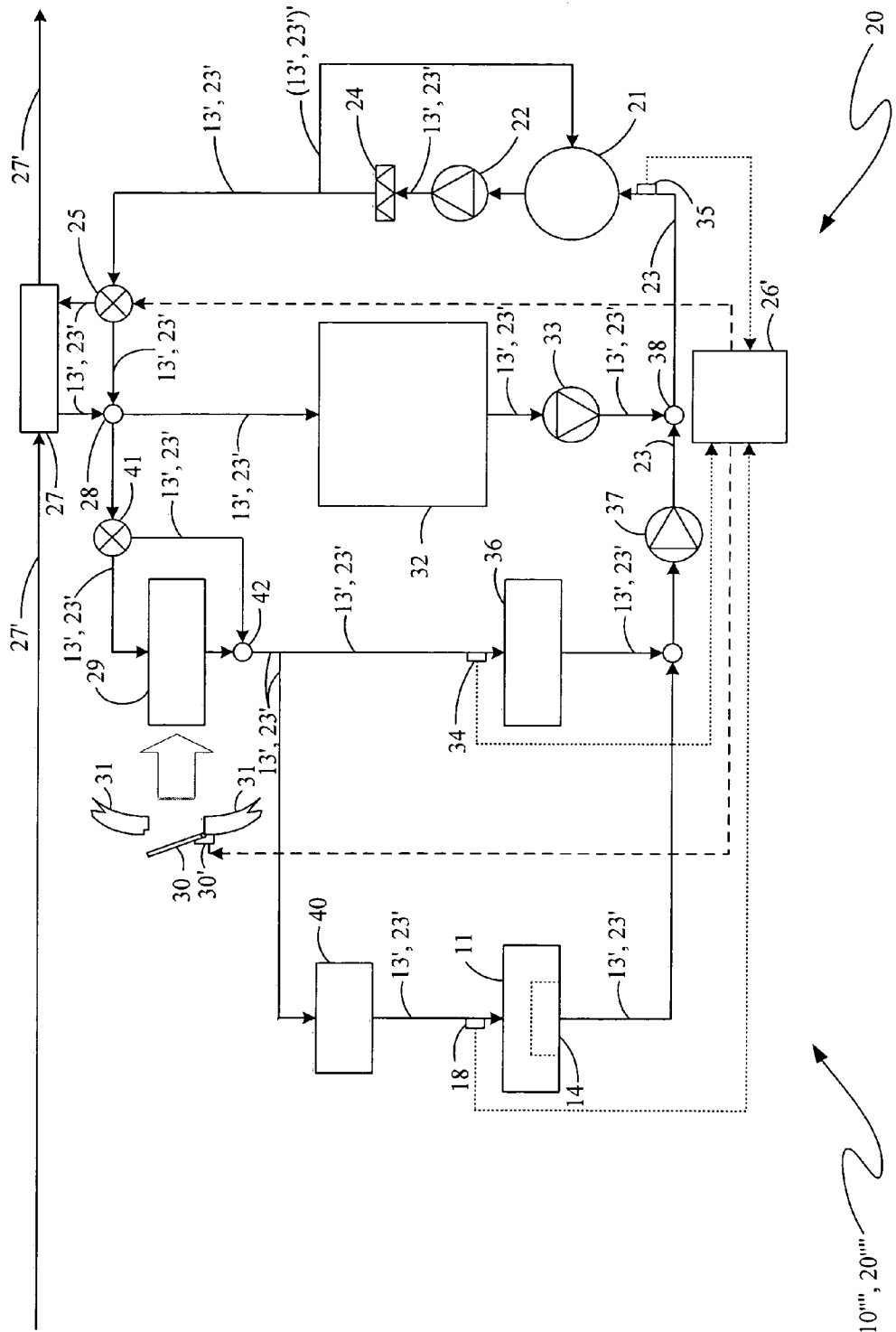
FIG. 6 shows a schematic diagram of an alternative integrated lubrication system embodying the present invention.

This consolidation in common lubrication system 10'''', 20'''' of FIG. 6 is accomplished by removing air and heat exchanger 12 from common lubrication system 10''', 20''' of FIG. 5, and then sizing air and oil heat exchanger 29 alone to keep the temperatures of the common lubrication oil within the necessary limits therefor in the extreme conditions described above for both the generator and engine. In addition, a bypass valve, 41, has been added to common lubrication system 10''', 20''' of FIG. 5 between combiner 28 and air cooled heat exchanger 29 therein to divert oil from exchanger 29 to a further combiner, 42, at the output of exchanger 29 in forming common lubrication system 10'''', 20'''' of FIG. 6. This allows controller 26' to have some of the common lubrication oil to bypass larger sized exchanger 29 to avoid cooling this oil too much such as at the starting of a cold engine when the then cool oil is desired to be warmed relatively quickly to provide better lubrication.

Although the present invention has been described with reference to preferred embodiments, workers skilled in the art will recognize that changes may be made in form and detail without departing from the spirit and scope of the invention.

The invention claimed is:

1. A heat exchange system for use in operating equipment having a plurality of subsystems in each of which a common lubricant is utilized to provide selected operations in that subsystem, the heat exchange system providing air and lubricant heat exchanges to cool that common lubricant at selectively variable rates in airstreams occurring with at least some uses of the operating equipment, the system comprising:

a reservoir containing at least some of the common lubricant;

a supply system connected between the reservoir and each of the plurality of subsystems through which common lubricant in the reservoir is conveyed from the reservoir to each of those subsystems;

a return system connected between each of the plurality of subsystems and the reservoir through which the common lubricant passing through each of the plurality of subsystems can be conveyed to the reservoir; and a first airstream heat exchanger connected in one of the supply and return systems, the first air stream heat exchanger being mounted in a first duct in the operating equipment having a first moveable flap cover at least a portion of one end of the first duct as selected by a control system such that the common lubricant conveyed through the first heat exchanger is cooled at selectively variable rates in the airstreams passing thereby during at least some such uses of the operating equipment; and a second airstream heat exchanger connected in one of the supply system and return systems so as to have the common lubricant conveyed therethrough cooled at selectively variable rates in the airstreams passing thereby during at least some such uses of the operating equipment.

2. The system of claim 1 wherein the first airstream heat exchanger is connected in the supply system between the reservoir and at least one of the plurality of subsystems.

3. The system of claim 2 wherein the first airstream heat exchanger is connected in the supply system between the reservoir and at least two of the plurality of subsystems.

4. The system of claim 3 wherein the first airstream heat exchanger is connected in the supply system between the reservoir and all of the plurality of subsystems.

5. The system of claim 3 wherein the first airstream heat exchanger is connected in the supply system between the reservoir and just one of the plurality of subsystems, and the second airstream heat exchanger is connected in the supply system between the first airstream heat exchanger and one of the two of the plurality of subsystems so as to have the common lubricant conveyed therethrough cooled at selectively variable rates in the airstreams passing thereby during at least some such uses of the operating equipment.

6. The system of claim 5 further comprising portions of the airstreams being forced into the first duct during at least some such uses of the operating equipment, and the second airstream heat exchanger being mounted in a second duct in the operating equipment with portions of the airstreams being forced into this second duct during at least some such uses of the operating equipment.

7. The system of claim 6 further comprising a second moveable flap and a flap actuator which can force the flap to at least in part cover a portion of one end of the second duct as selected by the control system.

8. The system of claim 2 wherein the first airstream heat exchanger is connected in the supply system between the reservoir and just one of the plurality of subsystems, and the second airstream heat exchanger is connected in the supply system between the reservoir and another one of the plurality of subsystems.

9. The system of claim 8 further comprising portions of the airstreams being forced into the first duct during at least some such uses of the operating equipment, and the second airstream heat exchanger being mounted in a second duct in the operating equipment with portions of the airstreams being forced into this second duct during at least some such uses of the operating equipment.

10. The system of claim 9 further comprising a second moveable flap and a flap actuator which can force the flap to at least in part, as selected by the control system, cover a portion of one end of the second duct.

11. The system of claim 1 further comprising portions of the airstreams being forced into the first duct during at least some such uses of the operating equipment.

12. The system of claim 1 further comprising an operating equipment fuel and common lubricant heat exchanger connected to the operating equipment so as to allow operating equipment fuel to pass along a first passageway therethrough and connected to the supply system so as to allow the common lubricant received from the reservoir to pass along a second passageway therethrough before reaching the first airstream cooled heat exchanger such that the common lubricant can transfer heat to the operating equipment fuel in this operating equipment fuel and common lubricant heat exchanger.

13. A common lubrication system for use with a turbofan engine and an integrated direct drive electrical generator powered by the turbofan engine in which systems a common lubricating oil is utilized for lubricating moving components with the common lubrication system providing air and lubricating oil heat exchanges to thereby cool the common lubricating oil at selectively variable rates in airstreams provided by the fan of the turbofan engine occurring during at least some operations of the turbofan engine, the system comprising:

a reservoir containing at least some of the common lubricating oil;

a supply system connected between the reservoir and both the turbofan engine and the electrical generator through which the common passing through the turbofan engine and the electrical generator can be conveyed to the reservoir; and a pair of airstream heat exchangers each mounted in a corresponding duct adjacent the turbofan engine with a moveable flap covering at least a portion of one end thereof as selected by a control system and each connected in one of the supply and return systems so as to each have the common working fluid conveyed therethrough cooled at selectively variable rates in the airstreams passing thereby during at least some such operations of the turbofan engine.

14. The system of claim 13 wherein one of the airstream heat exchangers is connected in the supply system between the reservoir and at least one of the turbofan engine and the electrical generator.

15. The system of claim 13 further comprising an operating equipment fuel and common lubricating oil heat exchanger connected to the turbofan engine so as to allow turbofan engine fuel to pass along a first passageway therethrough and connected to the supply system so as to allow common lubricating oil received from the reservoir to pass along a second passageway therethrough before reaching the airstream cooled heat exchanger such that the common lubricating oil can transfer heat to the turbofan engine fuel in this turbofan engine fuel and common lubricating oil heat exchanger.

* * * * *

UNITED STATES PATENT AND TRADEMARK OFFICE
CERTIFICATE OF CORRECTION

| | | |
|---|---|---|
| PATENT NO. | : 7,908,840 B2 | Page 1 of 1 |
| APPLICATION NO. | : 11/605671 | |
| DATED | : March 22, 2011 | |
| INVENTOR(S) | : Frederick M. Schwarz and Jorn A. Glahn | |

It is certified that error appears in the above-identified patent and that said Letters Patent is hereby corrected as shown below:

Col. 12, Line 12
   Insert --working fluid-- between "common" and "passing"

Signed and Sealed this
Tenth Day of May, 2011

David J. Kappos
*Director of the United States Patent and Trademark Office*